(12) United States Patent
McCormick

(10) Patent No.: X6504
(45) Date of Patent: Apr. 21, 1831

(54) VIOLIN, TEACHING THE ART OF

(76) Inventor: Robert Jr. McCormick

United States Patent

Patent No.: X6504

Robert Mc Cormick Jr Augusta Co. Virginia

Letters Patent

The Schedule referred to in these Letters Patent and making part of the same con-
-taining a description in the words of the said Robert Mc Cormick Jr himself of
his improvement in teaching the art of performing on the Violin Be it known that I Robert Mc Cormick Jr of the County of Augusta in the State
of Virginia have invented a new and useful improvement in teaching the art of
performing on the Violin. This invention consists of the following parts viz. Scale
No 1 Sharp Scale No 2 flat. Scale No 3 Sharp and the tuning block. These
several Scales constructed as follows exhibit the notes, and are used in the fol-
-lowing manner. The small bridge of a common Violin near the neck being
taken away. Scale No 1 is inserted into the finger board by a dovetail opening
corresponding in shape to the scale. Another small bridge is placed instead of
the common one about five eighths of an inch upon or within the finger board
which raises or [illegible] all the notes about that distance higher on the finger
board. The Scales are about four inches long and are of the same size, except the
tuning block which only goes into the second or ▲ string.

The note Scales are divided into frets forming inclined projection
rising at each semi-tone a fret about [illegible] part of an inch. Between the several
frets stand the characters ◇ △ ○ □ or in musick. me faw sol law as they
occur in the different keys on the Violin. Scale No 1 Sharp, is calculated for pie-
ces keyed in D major but will also answer for pieces that are keyed in ▲ major by moving
them a fifth below. The notes in the scale stand thus.

No 1

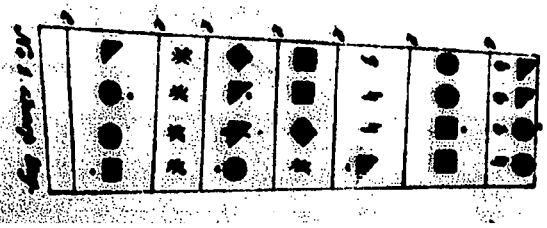

No 2.

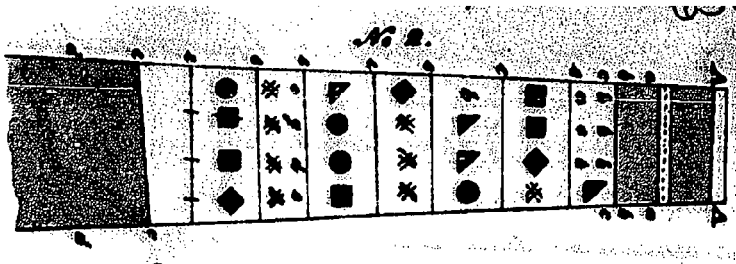

The Characters on the minor scale, marked No 2, stand thus.

No 3.

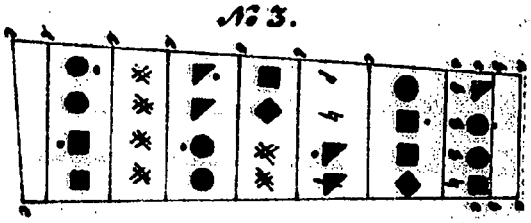

The Characters on the scale marked No 3, are calculated for pieces keyed on C major and stand thus.

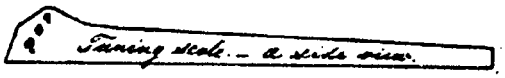

The tuning scale or tuning block is a small piece of wood adapted to the [illegible]
[illegible] with a projection rising at D A & B with notches in it to receive the strings
Explanation of the foregoing scales A A [illegible] end of the finger board. a. a. The
dotted line represents the nut or bridge. b b about one fourth of an inch of the finger board
extending above the nut or bridge. c c c c. The movable scales containing the
Characters Mee Faw Sol Law arranged to suit the different keys which may
be made of wood or other suitable material having elevated frets (projections) at
each semi tone [illegible] section of the finger board above the scale c, c, c, c, c, c, Etc
solid frets on which the string is confined when pressed by the finger on the note
column. The preceding scales each contain 17 degrees of sound a little more than
two octaves or [illegible] [illegible] of eight notes. In each octave the Characters faw
Sol law occur twice. The first time they occur above the key note in the lower octave
they are unmarked: the second time they are marked with a dot under them showing
that they belong to the lower octave and are immediately below the principal key
note. They occur also in the upper key or octave and are dotted above to show that
they are above the principal key note and belong to the upper octave. The key note
on each scale is marked with a bar line in to the direction of the strings. When
an occasional flat sharp or natural occurs its place will be seen on the scale.

The letters which are represented as Sharp at the beginning of a tune, have the
notes placed on them and their place supplied by naturals &c
Mode of operation ^in^ Tuning the Violin. The Violin is tuned by the tuning
Scale which is Shoved into the dovetail till the notch E comes under the Second
or A String. The treble or E String is raised to any height that may be desired
the second or A String is then placed in the notch at E and strained till it produces
the same sound with the treble. The tuning Scale is then Shoved back in order
to let the second String vibrate by the side of it. The third or d String is then pla-
-ced in the notch A and drawn in unison with the second. The tuning Scale
or block is Shoved in the Second placed in the notch E as before which will admit
the third String to vibrate between ^the projections^ A and D the lower String is placed in the
notch D and managed in like manner. This being done the tuning Scale
or block is removed.

Manner of playing by these Scales The Scale is Shoved into the dovetail which
is cut out of the finger board. The fingers are pressed firmly on the notes between
the frets or projections as they Stand on the Scale which confines the String on
these projecting frets from which it vibrates consequently the tone will not beal-
-tered though the fingers Should move up or down a Short distance. Or the Cha
=racters may be placed as in the preceding drawings in a book or otherwise and
committed to memory by the learner. Or they may be marked on paper
and placed on the finger board of the Violin; or the Characters may be cut in
the finger board of the violin The first however I consider the best mode which
is to have small thin movable Scales all of one size adapted to a dovetail
which is cut out of the finger board to receive them with elevated frets at each
semi tone which have already been described.

What I claim as my invention and for which I solicit a
Patent are the 3 musick Scales Class 1. 2. & 3. and their construction together
with the tuning Scale or tuning block and the manner of affixing the
[illegible] to common Violins

Witnesses
Wm P Elliot
Henry Bishop
[illegible]

[illegible] McCormick [illegible]

[illegible]
[illegible]